United States Patent Office 3,121,756
Patented Feb. 18, 1964

3,121,756
SEPARATORY PROCESS USING MODIFIED
MONTMORILLONITES
Richard M. Barrer, Bromley, England, assignor to Union
Carbide Corporation, a corporation of New York
No Drawing. Filed Oct. 14, 1960, Ser. No. 62,554
20 Claims. (Cl. 260—674)

This invention relates to modified forms of minerals of the montmorillonite group, their preparation, and the separation of mixtures with the modified montmorillonite minerals.

The montmorillonite group of minerals are naturally occurring. Structurally the mineral comprises pairs of siloxane sheets with each silicon atom in tetrahedral co-ordination with surrounding oxygens, and a layer of aluminum ions in octahedral coordination with the oxygen of the siloxane sheets. There may be some substitution of $Al^{+3}$ for $Si^{+4}$ in the tetrahedral layer, and of $Al^{+3}$ by $Mg^{+2}$ in the octahedral sheet, thus placing an over-all negative charge on the material. These negative charges are balanced by cations such as calcium and sodium. These minerals, in their natural state, are hydrophilic, and adsorb only small quantities of non-polar materials.

Montmorillonite, a specific mineral of the montmorillonite group of minerals, has the following typical composition, in which the charge on the alumino-siloxane layer arises from a substitution of $Mg^{+2}$ for some of the $Al^{+3}$ in the octahedral layer, and this is balanced by an exchangeable cation, e.g., sodium ion, indicated by the arrow:

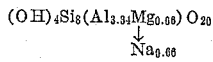

The primary source of the montmorillonite group of minerals is in bentonite which contains at least about 90 percent of these minerals.

The large scale use of platinum as a reforming catalyst for petroleum naphthas has introduced some new problems in feed preparation since the platinum catalyst is sometimes sensitive to a number of minor feed constituents. The principal offenders are sulfur compounds, nitrogen compounds and arsenic and lead compounds.

Sulfur in the form of its compounds generally occurs to a greater or lesser extent in all crude oils, the most common sulfur compounds being $H_2S$, elemental sulfur, thioethers, di- and polysulfides, mercaptans, and thiophenes. The presence of sulfur compounds in gasoline is objectionable mainly because of their unpleasant odor and their corrosive and poisoning effect on metals and catalysts. The tolerance of sulfur in desulfurized gasoline fractions is generally of the order of 30 p.p.m.

Nitrogen compounds are also found in traces in petroleum crudes, the main classes of compounds being pyridines, pyrroles, and quinolines. It has been recognized recently that nitrogen compounds, even in trace amounts, cause serious problems in processing petroleum and in the storage of petroleum products, the main effects being the poisoning of cracking catalysts and the formation of gums and precipitates.

The use of various clay minerals in the decolorization and clarification of petroleum oils has been known for many years; fuller's earth, activated bentonites and attapulgite being the most commonly used materials. However, although clays are effective in removing unsaturates and solid material from crude gasoline, under ordinary conditions little change is brought about in the sulfur content of the material being treated. ("The Science of Petroleum," vol. III, "Fuller's Earth Treatment of Cracked Gasoline" (Oxford), 1938.) For this reason the clay treatment of stocks with high sulfur contents is generally used in conjunction with various chemical desulfurization steps. There is a wide variety of such processes in use, the utility for each depending on the nature and source of the crude naphtha and the separation efficiency required. Also, as the various sulfur compounds present in crude petroleum have different chemical behavior, a combination of techniques is often necessary. Some of the more commonly used sweetening processes are listed below:

(1) Sulfuric acid treatment.
(2) Hydrogen treatment—catalytic conversion to $H_2S$, e.g., Hydrofining (Esso), Unfining (Union Oil), Ultrafining (Standard Oil).
(3) Solvent extraction, e.g., with $SO_2$ (Standard Oil), with furfural (Texaco), with organic amines (Girbotol process).
(4) Alkali wash, e.g., Unisol (UOP), Mercapsol (Pure Oil).

In a similar way, nitrogen compounds are generally removed by an alkali wash treatment. All of these processes have disadvantages such as high chemical consumption, and construction material, corrosion or sludge disposal problems.

It is the principal object of the present invention to provide modified forms of minerals of the montmorillonite group which adsorb substantial quantities of materials other than water.

It is a further object of the present invention to provide modified forms of minerals of the montmorillonite group which preferentially adsorb certain molecules and thus can be used to separate those molecules from mixtures containing them.

Still another object of the invention is to provide modified forms of minerals of the montmorillonite group which can be used to separate benzene from aliphatic hydrocarbons, oxygen from nitrogen or argon, and straight chain hydrocarbons from branched chain hydrocarbons.

Another object is to provide a process for producing the modified forms of montmorillonite and minerals of the montmorillonite group of the invention.

Another object is to provide a process for preferentially adsorbing certain elements and compounds.

Another object is to provide a process for removing sulfur and nitrogen compounds from a petroleum feed stock passing to a catalytic reaction.

While the present invention applies equally well to other members of the montmorillonite group of minerals, and to bentonite, in general, it will be described hereinafter with respect to the specific mineral, montmorillonite.

The objects of the invention are accomplished by substituting for the interlamellar sodium and calcium ions of the montmorillonite lattice to expand along its C axis to a $d_{001}$-spacing of at least 12 Angstroms. It has been discovered that mono-, di-, tri-, and tetra-substituted ammonium ions can be successfully and advantageously employed in making the modified montmorillonite of the invention. Other cations such as dibenzene $Cr^{++}$, $Fe^{++}$-dipyridyl, $Fe^{++}$ (1,10-phenanthroline) have also been successfully employed in making the modified montmorillonite.

The following table lists some of the properties of these modified forms of montmorillonite. The $d_{001}$ spacing, the surface area as determined by the B.E.T. method, and the decomposition temperature as found by differential thermal analysis are included.

PROPERTIES OF MODIFIED MONTMORILLONITES

| Exchanging Cations | $d_{001}$(A.) | S(m.²/g.) | Decomposition Temp., (°C.) |
|---|---|---|---|
| Black Hills Bentonite | 9.5 | 20 | 600–700 |
| Dibenzene Cr++ | 14.0 | 208 | 350 |
| (Guanidinium)+ | 12.7 | 173 | 250 |
| (Triethylenediamine)+ | 14.4 | 172 | 200 |
| Fe++-dipyridyl | 17.6 | 170 | 300 |
| Co(ethylenediamine)₂Cl₂+ | 13.6 | 94 | 200 |
| C₆H₅NH₃+ | 14.3 | 82 | 200 |
| (Hexamethylenetetramine)+ | 12.9 | 78 | 200 |
| Fe+++(1,10-phenanthroline) | 17.7 | 70 | 350 |
| Co(NH₃)₆+++ | 12.1 | 49.5 | 200 |
| Cu(Triethanolamine)++ | 13.9 | 10.4 | |

Clay minerals such as bentonite in the natural dehydrated state have a low specific surface area, around 10–30 m.²/g.; and their adsorptive capacity is therefore small. However, when the alkali metal cations in natural bentonite are exchanged with substantially spherical organic cations such as tetraalkyl ammonium ions, the surface area and adsorptive properties are greatly enhanced.

More particularly the process of the invention whereby the montmorillonite is modified comprises mixing a solution containing the ions which will expand the C-axis to a $d_{001}$ spacing greater than 12 A. with finely divided montmorillonite. The exchange is speeded up by heating. Following the exchange the montmorillonite is filtered, washed, and dried. Adsorbed water is removed, preferably by heating the modified montmorillonite in a partial vacuum. The modified material is then ready for use as an adsorbent. The modified material exhibits a capacity for adsorbing substantial quantities of both organic and inorganic materials, among which are oxygen, nitrogen, argon, benzene, n-pentane, iso-pentane, neopentane, methanol and tertiary butanol.

The following is illustrative of the process of the invention: About 5 grams of montmorillonite were dispersed in distilled water. A solution of about 5 grams of tetramethyl ammonium bromide in water was added to the dispersed montmorillonite. The mixture was stirred and heated for about thirty minutes at a temperature of about 50° C. The mixture was filtered and the modified montmorillonite washed until the bromide ions could no longer be detected in the wash water. The solid material was then dried and heated at a temperature of 50° C. in partial vacuum to remove adsorbed water.

In another example of the process of the invention tetraethyl ammonium montmorillonite was prepared in the manner set forth above by using tetraethyl ammonium chloride instead of the tetramethyl ammonium bromide.

In other examples of the invention the monomethyl ammonium, dimethyl ammonium, and trimethyl ammonium forms of montmorillonite have been prepared using solutions containing the appropriate ion.

The adsorptive properties of the modified montmorillonite of the invention were investigated in a series of tests. In these tests crystals of modified and natural montmorillonite which had been heated to remove adsorbed water, were exposed to an atmosphere containing molecules of adsorbate. The volume of adsorbate adsorbed by the crystals was measured. Data obtained during the tests are set forth in Table I. In the table the adsorbate molecule and temperature of adsorption are given as are the volumes of adsorbate adsorbed. These volumes are expressed in terms of cubic centimeters at standard temperature and pressure per gram of adsorbent. The modified forms of montmorillonite are designated in the table by the ion added to it by exchange. For example, the data obtained with monomethyl ammonium montmorillonite appears in the column headed

"NCH₃H₃+"

The tests were conducted under conditions such that the ratio of equilibrium pressure in the system to the saturation pressure of the liquid sorbate at the sorption temperature ($p/p_0$) was 0.2.

*Table I*

| Sorbate | Temp. (° K.) | Natural Montmorillonite | NCH₃H₃+ | N(CH₃)₃H+ | N(CH₃)₄+ | N(C₂H₅)₄+ |
|---|---|---|---|---|---|---|
| O₂ | 90 | 7 | 50 | 44 | 52 | 29 |
| N₂ | 90 | 6 | 47 | 42 | 45 | 18 |
| A | 90 | | 44 | 41 | | 14 |
| A | 78 | | | | 43 | 7 |
| CH₄ | 90 | | 38 | 36 | | 5 |
| n-C₄H₁₀ | 273 | | 17.8 | 13.2 | | |
| Iso-C₄H₁₀ | 273 | | 12.0 | 9.2 | | |
| Benzene | 323 | 1.7 | | | 27 | 8 |
| Toluene | | | | | 20 | |
| o-Xylene | | | | | 14 | |
| m-Xylene | | | | | 13.2 | |
| p-Xylene | | | | | 15 | |
| Cyclohexane | | | | | 12.5 | |
| Cyclopentane | | | | | 14.5 | |
| n-Pentane | | | | | 13.5 | |
| n-Heptane | | | | | 10.5 | |
| Iso-pentane | | | | | 12 | |
| Iso-octane | | | | | 7.5 | |
| Neo-pentane | | | | | 9 | |

The data in Table I demonstrates the great number of materials that can be adsorbed by the modified montmorillonite of the invention. Improvements over the adsorptive behavior of natural montmorillonite are apparent from a comparison of the test results obtained with the natural and modified crystals.

Also evident from the data in Table I is the selectivity of the tetra-ethyl modified montmorillonite in the presence of oxygen, nitrogen and argon. The preference of the crystals for oxygen over the other two elements and for nitrogen over argon is shown by the data. Additional data on this adsorption is given in Table II. In that table the amount of sorbate retained by the crystals is given in terms of the weight percent adsorbed, the adsorption temperature was 78° K., the adsorbent was tetraethyl ammonium montmorillonite from which water and other sorbates had been removed, and the ratio of equilibrium pressure in the system to the saturation pressure of the liquid sorbate at the sorption temperature was 0.5.

*Table II*

Adsorbate: Weight percent Adsorbed
Oxygen _____ 5.0
Nitrogen _____ 2.5
Argon _____ 1.8

As evidenced by the data above, a separation of oxygen from mixtures of oxygen with either nitrogen or argon or both can be effected. This separation is advantageously accomplished using as an adsorbent tetraethyl ammonium montmorillonite at a temperature of about 78° K. to 90° K. In a similar manner nitrogen can be separated from a mixture of nitrogen and argon.

Benzene is also very strongly adsorbed by the modified montmorillonite of the invention. This permits the separation of benzene from mixtures of benzene and other materials. For example, a mixture of one part n-heptane and two parts benzene was brought into contact with the modified montmorillonite of the invention. In about fifteen minutes the benzene had been completely adsorbed and pure n-heptane remained. In similar tests cyclohexane, methyl alcohol, carbon tetrachloride and toluene were separated from benzene. Benzene was also separated from thiophene but in this instance the benzene remained in the gas phase and the thiophene was adsorbed. Cyclohexane was separated from n-heptane, cyclohexanol and toluene using the modified montmorillonite of the invention and the techniques described above.

In general, the modified montmorillonites of the invention have been found to be effective in separating a number of mixtures by preferentially adsorbing one or more of the constituents of the mixture. A mixture of one member from at least two of the following six groups may be resolved into its component parts by the normal techniques of fraction adsorption, the mixture components being preferentially adsorbed in the order shown: heterocyclic compounds>unsubstituted aromatic hydrocarbon>alkyl-substituted aromatic hydrocarbons>straight-chain hydrocarbons>chlorinated straight-chain hydrocarbons>branched-chain and alicyclic hydrocarbons. In the preferred forms of the invention, the process may be used advantageously to separate the following mixtures by adsorption of:

(1) Benzene and/or alkyl-substituted benzenes from admixture with aliphatic hydrocarbons, and/or cyclic and/or chlorinated forms thereof;

(2) Straight-chain hydrocarbons from admixture with branched-chain and/or alicyclic hydrocarbons;

(3) Thiophene and/or pyridine from aliphatic hydrocarbons and/or cyclic and/or chlorinated forms thereof;

(4) Benzene from admixture with alkyl-substituted benzene;

(5) Separation of thiophene and/or pyridine from benzene and/or alkyl-substituted benzenes.

In a series of separations of the type described above, the technique of chromatographic separation was employed. A column having a diameter of 3.5 millimeters and a length of 50 centimeters was filled with the adsorbent being tested. The top of the column was connected to a supply of dry carrier gas, e.g., air or nitrogen, such that a sample of the gaseous mixture to be separated could be introduced, and carried through the column by the carrier gas. The exit of the column was connected to cold receiver tubes for freezing the effluent from the carrier gas for analysis. The column was contained in a constant temperature bath. The adsorbents were prepared from Wyoming bentonite which has an ion exchange capacity of 101 milliequivalents per 100 grams, by ion exchanging the bentonite with $(CH_3)_4N^+$ or $CH_3NH_3^+$ ions as described previously. Before use, the modified bentonites were activated in vacuo at 50° C.

In an example of the chromatographic separation, a mixture composed of 44.5 mole percent cyclohexane and 55.5 mole percent n-heptane was introduced into the top of a column charged with tetramethyl ammonium bentonite in a carrier stream of dry nitrogen. The column was held at 22° C., then raised to 77° C., and finally to 130° C. The data are shown in Table III.

*Table III*

| Time in Hours | Total Volume Collected, cc. | Mole-Percent Cyclohexane in Effluent | Temperature of Column, ° C. |
|---|---|---|---|
| 0.44 | 0.022 |  | 22 |
|  | 0.033 | 100 | 22 |
| 0.55 | 0.066 |  | 22 |
|  | 0.089 | 100 | 22 |
| 1.0 | 0.133 |  | 22 |
|  | 0.15 | 13.4 |  |
| 2.0 | 0.168 |  | 77 |
|  | 0.20 | 2.2 | 77 |
| 2.4 | 0.234 |  | 77 |
| 3.5 | 0.256 | 3.3 | 77 |
| 6.0 | 0.256 |  | 77 |
| 7.3 | 0.278 |  | 130 |
| 10.0 | 0.30 | 2.2 | 130 |
|  | 0.32 | 1.1 | 130 |

As may be seen from these results n-heptane is selectively adsorbed from the mixture; it is easily recovered from the adsorbent in relatively pure form.

Examples of separations of other hydrocarbon mixtures are shown in Table IV. These results were obtained in the same manner as above. In the table the "A" component is the one selectively adsorbed whereas the "B" component is the one coming through the column first essentially free of the "A" material.

*Table IV*

| Ammonium Bentonite Adsorbent | Hydrocarbon Mixture Separated | | Mol. Fraction of Components | | Temp. of Column, ° C. |
|---|---|---|---|---|---|
|  | A | B | A | B |  |
| Tetramethyl | Benzene | Cyclohexane | 0.605 | 0.395 | 77 |
| Do | Toluene | do | 0.46 | 0.54 | 77 |
| Do | Benzene | n-Heptane | 0.645 | 0.355 | 77 |
| Do | do | Carbontetrachloride | 0.465 | 0.535 | 77 |
| Do | do | Toluene | 0.50 | 0.50 | 77 |
| Do | n-Hexane | Cyclohexane | 0.221 | 0.779 | 22, 77 & 130 |
| Do | n-Heptane | do | 0.555 | 0.445 | 20, 77 & 130 |
| Do | do | Iso-octane | 0.55 | 0.45 | 20 & 130 |
| Do | Thiophene | Benzene | 0.485 | 0.515 | 77 |
| Do | Carbontetrachloride | Cyclohexane | 0.46 | 0.54 | 20 |
| Monomethyl | Benzene | do | 0.705 | 0.295 | 77 |
| Do | do | Iso-octane | 0.63 | 0.37 | 77 |
| Do | n-Heptane | do | 0.5 | 0.5 | 77 |

Mixtures of iso-octane and cyclohexane and of cyclohexane and cyclopentane were not easily separated with a tetramethyl ammonium bentonite adsorbent. These hydrocarbons were about equally adsorbed; however they can be separated from benzene, toluene, n-heptane, thiophene and carbon tetrachloride by selective adsorption using tetramethyl ammonium bentonite.

In general the tetramethyl ammonium bentonite is superior to the monomethyl form as a selective adsorbent for separating hydrocarbons. It has greater adsorption capacity and gives cleaner separations.

Thiophene is very strongly adsorbed by tetramethyl ammonium bentonite. A solution containing 0.5 percent thiophene and 99.5 percent benzene was passed through an adsorption column containing this adsorbent. The effluent fractions gave a negative indophenine test for thiophene.

In another example illustrating chromatographic separation of complex mixtures of hydrocarbons a six component mixture was passed through a 66 centimeter column having a diameter of 2.5 centimeters which was packed with 110 grams of tetramethyl ammonium bentonite. The column was maintained at 85° C. throughout the run. The vapors were carried through the column and samples collected as in the previous examples of chromatographic separations. The mixture contained 2.8 cubic centimeters each of thiophene, benzene, and toluene, 8.3 centimeters of n-heptane and 4.2 cubic centimeters each of cyclohexane and carbon tetrachloride. The mixture was double fractionated and the samples collected and analyzed. The results are shown in Table V.

Table V

| Fraction | Volume in cc. | Approximate Composition of Fraction |
|---|---|---|
| 1 | 0.3 | 75% cyclohexane+25% CCl₄. |
| 2 | 2.6 | 60% cyclohexane+40% CCl₄. |
| 3 | 2.4 | 50% cyclohexane+50% CCl₄. |
| 4 | 0.8 | 35% cyclohexane+60% CCl₄+some n-heptane. |
| 5 | 0.5 | 20% cyclohexane+50% CCl₄+30% n-heptane. |
| 6 | 0.6 | 60% CCl₄+40% n-heptane. |
| 7 | 0.5 | 90% n-heptane+10% CCl₄. |
| 8 | 1.5 | 99% n-heptane. |
| 9+10 | 2.9 | 80% n-heptane+20% toluene and benzene. |
| 11 | 0.5 | 60% n-heptane+40% toluene and benzene. |
| 12 | 4.0 | 90% toluene & benzene+10% n-heptane. |
| 13 | 4.0 | 97% toluene and benzene. |
| 14+15 | 1.1 | 95% thiophene. |

In a series of examples to illustrate the applicability of the present process to liquid separations a liquid hydrocarbon mixture was contacted and equilibrated with tetramethyl ammonium bentonite. The unadsorbed liquid was separated by centrifuging the mixture of hydrocarbons and modified bentonite in smaller cells fitted with porous glass disks which retained the solid but freely passed the liquid for collection and analysis. Results are shown in Table VI.

Table VI

| Hydrocarbon Mixture | Wt. of Adsorbent Used, Grams | Vol. of Mixture Used, cc. | Comp. of Separated Liquid |
|---|---|---|---|
| 50 mole-percent benzene, 50 mole-percent isooctane. | 7.5 | 2 | 96% iso-octane. |
| 70 mole-percent cyclohexane, 10 mole-percent benzene, 10 mole-percent thiophene, 10 mole-percent toluene. | 6.5 | 2 | 97% cyclohexane. |
| 60 mole-percent benzene, 40 mole-percent n-heptane. | 7.5 | 1.7 | 98% n-heptane. |
| 67 mole-percent n-heptane, 33 mole-percent iso-octane. | 7 | 1.5 | 75% iso-octane. |
| 25 mole-percent benzene, 75 mole-percent cyclohexane. | 6 | 4.5 | 92% cyclohexane. |

To be practical for use in the separation of hydrocarbon mixtures it is essential that the modified montmorillonite adsorbents be sufficiently stable so that the adsorbed phase can be removed and the adsorbent reactivated without loss of its adsorptive capacity. Heating under vacuum or while sweeping the clay with a gas that is but slightly adsorbed at the activation temperature are practical means of accomplishing this result. In a series of tests to determine the stability of the several methyl ammonium bentonites relative to change in adsorptive capacity with increasing activation temperature the adsorbents were outgassed by heating under a vacuum of $10^{-6}$ centimeters of mercury at the temperature indicated in Table VII. Adsorptive capacity is indicated by the relative change in surface area as measured by low temperature gas adsorption techniques. These relative surface areas are shown in Table VII.

Table VII

| Activation Temp., °C. | Relative Surface Area, 50° C. Value=100% | | | |
|---|---|---|---|---|
| | Monomethyl-ammonium Bentonite | Dimethyl-ammonium Bentonite | Trimethyl-ammonium Bentonite | Tetramethyl-ammonium Bentonite |
| 100 | 100 | 100 | 100 | 100 |
| 150 | 100 | 100 | 100 | 118 |
| 200 | 89 | 100 | 100 | 118 |
| 250 | 62 | 85 | 100 | 118 |
| 300 | 17 | 40 | 65 | |
| 350 | 17 | 25 | 25 | 33 |
| 400 | | 25 | 25 | 20 |

The results indicate that the mono- and dimethyl ammonium bentonites can be activated at temperatures up to about 175° C. and the tri- and tetramethyl ammonium bentonites up to about 250° C. without detrimental alteration of the adsorption capacity.

In a series of examples to determine the comparative adsorption capacity of exchanged clays from various sources, representative samples of bentonite from Black Hills, South Dakota; Chambers, Arizona; Colony, Wyoming; and Rock River, Wyoming, were ion-exchanged with tetramethyl ammonium chloride by the following procedure. The bentonite was dispersed in water in the ratio of 25 grams of clay to 400 cubic centimeters of water and the slurry was heated to 50° C. Tetramethyl ammonium chloride in a six fold excess over the theoretical exchange capacity of the bentonite was then added to the slurry and the mixture heated at 50° C. for thirty minutes. The mixture was then filtered, washed free of chloride and dried by heating at 100° C. for 16 to 24 hours. Analysis of the bentonites before and after ion-exchange indicated that from about 30 to 36 percent of the total sodium, potassium, calcium and magnesium ions were exchanged. Not all of these elements are exchangeable and it is estimated that at least 70 percent of the readily exchangeable ions in the original clay were replaced by tetramethyl ammonium ions. The adsorption capacities of the modified bentonites were measured at a relative pressure of 0.2. The relative pressure is defined as the ratio of the partial pressure of adsorbate vapor in equilibrium with adsorbent to the vapor pressure of adsorbate at test temperature. These adsorption capacities are shown in Table VIII.

Table VIII

| Temp., °C. | Adsorbate | Adsorption Capacity, gms. of Adsorbate per 100 gms. | | | |
|---|---|---|---|---|---|
| | | Black Hills | Chambers | Colony | Rock River |
| −195 | Nitrogen | 6.7 | 6.8 | 7.1 | 5.8 |
| −183 | Oxygen | 8.3 | 8.2 | 8.7 | 7.3 |
| 0 | n-Butane | 5.6 | 5.4 | 5.8 | 4.7 |
| 22 | n-Heptane | 6.2 | 5.7 | 6.6 | 5.4 |

As may be seen from these data a wide variety of naturally occurring bentonites can be used in accordance with the process of the present invention. The unmodified bentonites adsorbed less than 1 gram of the vapors shown in the table.

In another series of examples to illustrate the high degree of selectivity, the high capacity for the adsorbate and the high rate of adsorption and ready activation without loss of capacity of the modified bentonites, a glass adsorption column 12 inches long and 0.4 inch in inside diameter was filled with 22 grams of adsorbent. The column was held in a vertical position and contained in an insulated jacket equipped with electrical heating elements such that the column temperature could be controlled at any temperature from room temperature up to 150° C. The bottom of the column was connected to a feed tank containing a hydrocarbon mixture held under sufficient pressure e.g., 1 to 2 inches of mercury gauge, to cause a steady flow of from about 2 to 3 milliliters per minute of liquid upwards through the column. Samples of the effluent liquid were taken at frequent intervals for analysis and the composition of the effluent was determined from refractive index values by comparison with known standards. These values were occasionally checked against chromatographic standards. The adsorbents were activated before each run with a dry nitrogen purge at 150° C. for one hour followed by a final outgassing at 150° C. under reduced pressure of about 1 millimeter of mercury for about 27 hours. The following tables illustrate various separations according to this technique.

Table IX.—Benzene Cyclohexane Separation

[Process variables: Mixture 9.8% benzene—remainder cyclohexane; adsorbent tetramethyl ammonium bentonite (Black Hills); flow rate through column—2 to 3 milliliters per minute]

| Cut No. | Wt. of Cut, Grams | Total Volume of Effluent, ml. | Wt.-Percent Benzene in Effluent | Temp. of Column, °C. |
|---|---|---|---|---|
| 1 | 1.590 | 2.06 | 0.0 | 25 |
| 2 | 1.911 | 4.53 | 0.0 | 25 |
| 3 | 2.566 | 7.88 | 0.0 | 25 |
| 4 | 2.224 | 10.76 | 0.0 | 25 |
| 5 | 2.293 | 13.74 | 0.0 | 25 |
| 6 | 2.048 | 16.40 | 0.0 | 25 |
| 7 | 2.136 | 19.18 | 0.0 | 25 |
| 8 | 2.285 | 22.14 | 0.0 | 25 |
| 9 | 2.221 | 25.03 | 0.0 | 25 |
| 10 | 1.707 | 27.25 | 1.5 | 25 |
| 11 | 1.783 | 29.56 | 4.2 | 25 |
| 12 | 2.095 | 32.28 | 7.5 | 25 |
| 13 | 3.086 | 34.94 | 9.6 | 25 |
| 14 | 3.105 | 38.81 | 9.8 | 25 |
| 15 [1] | 2.00 | 30.31 | 9.9 | 25 |
| 16 | 5.62 | 48.33 | 19.5 | 90 |
| 17 | 0.81 | 49.30 | 99 | 150 |

[1] Benzene-cyclohexane feed discontinued at this point and column heated and purged with dry argon.

The breakthrough capacity, 9.2 weight percent adsorbed benzene in the example, is estimated from a plot of the data and is the maximum loading of the adsorbed phase that can be had and yet give sharp separation of the two phases.

After cut No. 15 the benzene-cyclohexane feed was stopped and the column heated to 150° C. while passing a stream of dry argon upwards through the adsorbent. Cuts No. 16 and 17 were condensed from the argon stream and show that the adsorbed component (benzene) is easily removed and can be recovered in a relatively pure form.

Another series of tests with tetramethyl ammonium bentonite separations at 25° C. are shown in Table X.

Table X

| Run | Wt.-Percent Composition of Mixture | Breakthrough Capacity | Adsorbed Component |
|---|---|---|---|
| 1 | 9.4% benzene, 90.6% iso-octane | 9.4 | Benzene. |
| 2 | 9.4% benzene, 90.6% iso-octane | 9.4 | Do. |
| 3 | 55.4% benzene, 44.6% iso-octane | 9.2 | Do. |
| 4 | 10.6% benzene, 89.4% n-heptane | 10.0 | Do. |
| 5 | 10.0% n-heptane, 90.0% iso-octane | 3.1 | n-Heptane. |
| 6 | 10.7% toluene, 89.3% methylcyclohexane | 5.7 | Toluene. |
| 7 | 10.6% benzene, 89.4% n-heptane | 9.7 | Benzene. |
| 8 | 12.3% benzene, 87.7% iso-octane | 9.0 | Do. |
| 9 | 8.7% n-heptane, 91.3% methylcyclohexane | 2.1 | n-Heptane. |
| 10 | 11.4% n-heptane, 88.6% cyclohexane | 2.1 | Do. |
| 11 | 10.2% benzene, 89.8% toluene | 4.8 | Benzene. |

A tetramethyl ammonium bentonite prepared employing only a two fold excess of tetramethyl ammonium chloride in the ion exchange step was found to provide substantially the same degree of adsorption as with bentonites which were prepared employing a six fold excess of the chloride thereby indicating that the quantity of excess salt in the exchange reaction is not critical. These data are shown in Table XI.

Table XI

| Mixture | Breakthrough Capacity, Percent | Component Adsorbed |
|---|---|---|
| 10.6 wt.-percent benzene, 89.4 wt.-percent n-heptane. | 9.7 | Benzene. |
| 12.3 wt.-percent benzene, 87.7 wt.-percent iso-octane. | 9.0 | Do. |
| 8.7 wt.-percent n-heptane, 91.3 wt.-percent methylcyclohexane. | 2.1 | n-Heptane. |
| 11.4 wt.-percent n-heptane, 88.6 wt.-percent cyclohexane. | 2.1 | Do. |
| 10.2 wt.-percent benzene, 89.8 wt.-percent toluene. | 4.8 | Benzene. |

The variation in surface area for tetramethyl ammonium bentonite with percent exchange is shown in the following table:

| Clay:Amine (Equiv. in Original Suspension) | Surface Area, m.²/g. | Percent Exchange (Overall) |
|---|---|---|
| 1:6 | 196 | 55 |
| 1:3 | 194 | 53 |
| 1:2 | 191 | 56 |
| 1:1 | 170 | 46 |

The surface area fell only slowly as the clay:amine ratio in the original mixture was increased, a three fold decrease in initial concentration of amine producing a surface area change of only 3%. With an amine:clay ratio of less than 2:1, the surface area dropped sharply and the product was noticeably colloidal. Clay:amine ratios of between 1:2 and 1:6 gave products with the highest activities.

As with the alkyl-ammonium exchanged bentonites, the adsorption capacity for other modified clays was found to be a function of the amount of exchange. Both the $Fe^{+++}$ (1,10-phenanthroline) and the $Fe^{++}$-dipyridyl modified clays showed a maximum surface area at a certain concentration of complex. This effect is illustrated in the following table:

| | Clay/Complex | $d_{001}$, A. | S, m.²/g. | Percent Exchange (Overall) |
|---|---|---|---|---|
| $Fe^{+++}$(1,10-phenanthroline) | 1:1 | 17.8 | 26.5 | 62.9 |
| | 25:1 | 17.7 | 69.5 | 42 |
| | 5:1 | 14.7 | 59.0 | 32.8 |
| | 10:1 | 13.0 | 32.8 | |
| $Fe^{++}$-dipyridyl | 1:1 | 17.9 | 82.5 | 56 |
| | 25:1 | 17.6 | 170 | 39.5 |
| | 5:1 | 14.0 | 66 | |

To illustrate the use of monomethylammonium bentonite this modified bentonite was prepared in the same manner as previously shown employing a six fold excess of monoethylammonium chloride. The modified bentonite gave the separation of a 10.7 percent benzene, 89.3 percent n-heptane at 25° C. as shown in Table XII.

Table XII

| Cut No. | Wt. of Cut, Grams | Total Wt. of Effluent in Grams | Total Volume of Effluent in ml. | Weight-Percent Benzene in Effluent |
|---|---|---|---|---|
| 1 | 0.596 | 0.596 | 0.851 | 2.5 |
| 2 | 1.049 | 1.645 | 2.35 | 3.8 |
| 3 | 1,285 | 2,930 | 4.19 | 5.8 |
| 4 | 1.531 | 4.461 | 6.37 | 6.8 |
| 5 | 1.345 | 5.806 | 8.29 | 7.6 |
| 6 | 1.363 | 7.169 | 10.24 | 7.9 |
| 7 | 1.473 | 8.642 | 12.34 | 8.6 |
| 8 | 1.469 | 10.11 | 14.44 | 9.0 |
| 9 | 1.799 | 11.91 | 17.01 | 9.0 |
| 10 | 1.704 | 13.61 | 19.44 | 9.3 |
| 11 | 1.833 | 15.45 | 22.07 | 9.8 |
| 12 | 2,340 | 17.79 | 25.41 | 10.3 |
| 13 | 3.209 | 21.00 | 30.00 | 10.5 |
| 14 | 3.260 | 24.26 | 34.65 | 10.5 |

The separation of a 54.7 benzene-45.3 iso-octane mixture by means of adsorption with monomethyl ammonium bentonite at 25° C. is shown in Table XIII.

Table XIII

| Cut No. | Wt. of Cut, Grams | Total Wt. of Effluent in Grams | Total Volume of Effluent in ml. | Refractive Index $nD^{25}$ of Effluent | Wt.-Percent Benzene in Effluent |
|---|---|---|---|---|---|
| 1 | 0.851 | 0.851 | 1.09 | 1.3940 | 6.9 |
| 2 | 0.935 | 1.786 | 2.29 | 1.4140 | 30.0 |
| 3 | 0.662 | 2.448 | 3.14 | 1.4260 | 42.2 |
| 4 | 1,038 | 3,486 | 4.47 | 1.4318 | 48.0 |
| 5 | 0.924 | 4.410 | 5.65 | 1.4342 | 50.4 |
| 6 | 1.566 | 5.976 | 7.66 | 1.4360 | 52.4 |
| 7 | 1.702 | 7.678 | 9.84 | 1.4370 | 53.1 |
| 8 | 6.879 | 14.56 | 18.67 | 1.4379 | 53.9 |
| 9 | 2.155 | 16.71 | 21.42 | 1.4381 | 54.1 |
| 10 | 4.542 | 21.25 | 27.24 | 1.4381 | 54.1 |

Note.—Breakthrough capacity=4.5 percent.

The separation of a 49.3 percent benzene-50.7 percent heptane mixture employing monomethyl ammonium bentonite at 25° C. as the adsorbent is shown in Table XIV.

*Table XIV*

| Cut No. | Wt. of Cut, Grams | Total Wt. of Effluent in Grams | Total Volume of Effluent in ml. | Refractive Index $nD^{25}$ of Effluent | Wt.-Percent Benzene in Effluent |
|---|---|---|---|---|---|
| 1 | 0.348 | 0.348 | 0.497 | 1.3970 | 15.5 |
| 2 | 0.431 | 0.779 | 0.11 | 1.4010 | 20.3 |
| 3 | 0.454 | 1.233 | 1.69 | 1.4080 | 28.2 |
| 4 | 0.606 | 1.839 | 2.52 | 1.4150 | 35.2 |
| 5 | 1.103 | 2.942 | 4.04 | 1.4211 | 41.2 |
| 6 | 0.984 | 3.926 | 5.23 | 1.4250 | 44.6 |
| 7 | 1.631 | 5.557 | 7.41 | 1.4273 | 47.4 |
| 8 | 3.370 | 8.927 | 11.90 | 1.4298 | 47.8 |
| 9 | 3.136 | 12.07 | 16.08 | 1.4305 | 48.4 |
| 10 | 2.614 | 14.68 | 19.57 | 1.4305 | 48.4 |
| 11 | 3.898 | 18.58 | 24.78 | 1.4309 | 49.0 |

It has been discovered that the modified montmorillonites of this invention can be used to remove both nitrogen and sulfur containing compounds. Traces of these impurities can be completely removed from gasoline feeds by passage in the liquid phase, at room temperature through a column of activated modified-montmorillonite. The order of selectivity of sulfur compounds for the modified montmorillonites of this invention is as follows:

Thiophenes, thiophenols (aromatic mercaptans)>sulfides>aliphatic mercaptans

Pyrrole and pyridine are also effectively removed by this material. Experiments, carried out under the same conditions, indicated very little separation of sulfur and nitrogen compounds by natural bentonite, even when freshly activated.

The following example demonstrates the preparation and activation of $N(CH_3)_4^+$ bentonite and its use in a typical separation:

About 200 g. of dry Black Hills bentonite was dispersed in a large excess of water. The suspension was warmed to about 70° C. and a solution of 86 g. of tetramethylammonium chloride in 200 ml. water $(CH_3)_4NCl$, was added slowly with stirring. Flocculation was immediate but stirring was continued for about one hour. The mixture was then filtered, the residue washed free of chloride, dried at 100° C. and ground to 20-40 mesh.

A glass column 10 in. x ¾ in. I.D. was packed with 54 g. of the dried product. The adsorbent was then activated with a dry nitrogen purge at 150° C. for one hour, followed by a final outgassing at the same temperature under reduced pressure overnight. The weight of activated clay was then 47 g. A mixture of a light naphtha (300° F. end point) containing 5000 p.p.m. sulfur as thiophene (1%) and thiophenol (1%) and 1800 p.p.m. nitrogen as pyridine (1%) was used as feed. The feed passed upwards through the column at room temperature at a rate of 3–5 ml./min. and weighed fractions of effluent were collected and analyzed. The results are shown in the table below:

FEED—LIGHT NAPHTHA (5000 p.p.m. S+1800 p.p.m. N)
[47 g. $(CH_3)_4 N^+$-bentonite activated at 150° C.]

| Cut. No. | Wt. Effluent (g.) | Conc. S in Effluent (p.p.m.) | Conc. N in Effluent (p.p.m.) |
|---|---|---|---|
| 1 | 9.16 | [1] 20 | [2] 20 |
| 2 | 22.5 | 20 | 20 |
| 3 | 36.2 | 20 | 20 |
| 4 | 47.3 | 20 | 20 |
| 5 | 56.4 | 40 | 20 |

[1] S analysed by combustion, limit of analysis ±20 p.p.m.
[2] N analysed by Kjeldahl, limit of analysis ±20 p.p.m.

The breakthrough capacity for sulfur was approximately 1%. At the end of the run, the column was heated with a nitrogen purge and the adsorbed material was completely removed (at temperatures about 150° C.)

The results of a control run with untreated bentonite are given below.

FEED—LIGHT NAPHTHA (5000 p.p.m. S+1800 p.p.m.)
[24.3 g. bentonite activated at 150° C.]

| Cut No. | Wt. Effluent (g.) | Conc. S in Effluent wt.-percent | Conc. S in Effluent p.p.m. | Conc. N in Effluent (p.p.m.) |
|---|---|---|---|---|
| 1 | 4.5 | 0.27 | 2,700 | 20 |
| 2 | 8.9 | 0.40 | 4,700 | 20 |
| 3 | 14.3 | 0.44 | 4,400 | 20 |
| 4 | 20.8 | 0.47 | 4,700 | 20 |

A summary of the results achieved with $(CH_3)_4N^+$ bentonite and various mixtures is given below.

| Impurity | Feed | Percent Impurity in feed | Percent Before Breakthrough [1] | Loading at Breakthrough | Sep. |
|---|---|---|---|---|---|
| CS₂ | N-heptane | 10 | 0.1 % | 1.2 wt.-percent | Sharp. |
| Thiophene | Naphtha | 0.1 | 5 p.p.m., S | 0.16 | Do. |
| Do. | do | 0.1 | 5 p.p.m., S | 2.5 | Do. |
| Thiophene, t-Butyl-mercaptan | do | 1 | 0.05% | 0.2 | Do. |
| Thiophenol | do | 4 | 20 p.p.m., S | 7% | Do. |
| Thiophene, Thiophenol | do | 0.52 S | 20 p.p.m., S | 0.6% | Do. |
| S and N | Crude | 0.1 S | | | Fair. |
| Pyrrole | do | Traces | | | Sharp. |
| Pyridine | Naphtha | 0.2 N | 20 p.p.m., N | 0.2 | Do. |
| Do. | Benzene | 13.6 | 0.05% | 2.8% | Do. |

[1] Limit of accuracy of analysis.

Passage of a crude naphtha through a column of modified montmorillonite also results in improved color of the sample, suspended solids and polymerized material being removed. A column of modified montmorillonite thus combines the functions of a fuller's earth decolorizer, a desulfurization unit, and a nitrogen removal step. The modified montmorillonite is also effective in the removal of traces of metals from crudes, such as arsenic, copper, and lead which act as catalyst poisons.

In still other examples of the invention, $CS_2$ was separated from n-heptane, phenyl mercaptan from naphtha and sulfur from naphtha with the modified montmorillonites of the invention.

REMOVAL OF 10% $CS_2$ FROM n-HEPTANE
[Activation temp.=120° C.; liquid flow rate=2–3 ml./min.; wt. of activated $(CH_3)_4N^+$-bentonite=23 g.; column temp. =25° C.]

| Cut No. | Wt. Effluent, g. | Wt.-Percent $CS_2$ in Effluent |
|---|---|---|
| 1 | 0.551 | [1] 0 |
| 2 | 2.290 | [1] 0 |
| 3 | 3.650 | 0.6 |
| 4 | 5.282 | 1.8 |
| 5 | 7.675 | 3.8 |
| 6 | 9.630 | 5.9 |
| 7 | 11.15 | 7.2 |
| 8 | 13.51 | 8.6 |

[1] $CS_2$ undetectable by refractive index.
NOTE.—Breakthrough loadings=1.2%.

REMOVAL OF PHENYL MERCAPTAN FROM NAPHTHA

4% phenyl mercaptan ($C_6H_5SH$) was added to a light naphtha and the mixture passed through an activated column containing 22 g. $(CH_3)_4N^+$ bentonite, temp. of column=25° C., feed flow rate =2-3 ml./min.

| Cut No. | Wt. Effluent, g. | Wt.-Percent Thiophenol in Effluent |
| --- | --- | --- |
| 1 | 1.898 | [1] 0 |
| 2 | 3.943 | 0 |
| 3 | 5.959 | 0 |
| 4 | 8.493 | 0 |
| 5 | 11.537 | 0 |
| 6 | 18.775 | 0 |
| 7 | 21.931 | 0 |
| 8 | 28.100 | 0.2 |
| 9 | 36.362 | 1.9 |
| 10 | 45.963 | 4 |

[1] Thiophenol undetected by refractive index. Combustion analysis or total sulfur gave 20 p.p.m., S.

NOTE.—Breakthrough loading=7%.

REMOVAL OF SULFUR FROM A LIGHT NAPHTHA ($C_5$–$C_7$ CUT)

To 100 ml. naphtha was added 1.5 ml. t-butyl mercaptan+1.2 ml. thiophene. The mixture then contained >1% total sulfur.

Liquid passed at a rate of 1–2 ml./min. through column containing 24 g. activated $(CH_3)_4N^+$ bentonite at room temp. (25° C.)

| Cut No. | Wt. Effluent, g. | Wt.-Percent in Effluent |
| --- | --- | --- |
| 1 | .631 | [1] 0 |
| 2 | 1.840 | 0 |
| 3 | 4.233 | 0.07±.05 |
| 4 | 6.563 | 0.25±0.05 |
| 5 | 9.658 | 0.35±0.05 |
| 6 | 17.787 | 0.32±0.05 |

[1] S could not be detected by the combustion method of analysis, which had an accuracy of ±0.05% S.

NOTE.—Breakthrough loadings=0.2%.

The preparation of the modified montmorillonites of this invention is shown in the following examples:

PREPARATION OF HEXAMETHYLENETETRAMINE $(CH_2)_6N_4H^+$ BENTONITE 25 g. of Black Hills bentonite were dispersed in 400 ml. distilled water with a mechanical blender. 22.5 g. hexamethylenetetramine were dissolved in 150 ml. distilled water and 12.5 ml. 37% hydrochloric acid added. The clay suspension was heated to 50° C. and the amine hydrochloride solution was added slowly with stirring. The mixture was stirred for about 20 mins. and then allowed to stand overnight. The modified clay flocculated rapidly. After standing overnight, the suspension was filtered through a Whatman 40 paper on a Büchner funnel and the product washed until free of chloride. The residue was dried overnight at 100° C.

PREPARATION OF GUANIDINE $(NH_2)_2C:NH_2^+$ BENTONITE 10 g. of Black Hills bentonite was dispersed in 300 ml. distilled water with an Osterizer Blender. The suspension was warmed to 60° C. and a solution of 4.8 g. guanidine hydrochloride in 100 ml. water was added slowly with stirring. Flocculation occurred after about half a minute. The mixture was stirred vigorously at 60° C. for 30 mins. and the precipitate allowed to stand for one hour. The product was filtered through a Whatman 40 paper on a Büchner funnel and the residue washed free of chloride. The product dried at 100° C. overnight.

This application is a continuation-in-part of U.S. Serial No. 691,795, filed October 23, 1957, now abandoned.

What is claimed is:

1. A process for the separation of a mixture of organic compounds which comprises bringing a mixture of at least one member from at least two of the following groups: (a) heterocyclic compounds (b) unsubstituted aromatic hydrocarbons (c) alkyl-substituted aromatic hydrocarbons (d) straight-chain hydrocarbons (e) chlorinated straight-chain hydrocarbons (f) branch-chain and alicyclic hydrocarbons into intimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations and preferentially adsorbing the mixture components in the order in which they appear in the aforementioned groups.

2. A process for the separation of a mixture of organic compounds which comprises bringing a mixture of at least one member from at least two of the following groups: (a) thiophene (b) benzene (c) toluene (d) straight-chain hydrocarbons (e) carbon tetrachloride (f) branch-chain hydrocarbons into intimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations and preferentially adsorbing the mixture components in the order in which they appear in the aforementioned groups.

3. A process for separating at least one member of the group consisting of benzene and alkyl-substituted benzene from a mixture thereof with at least one member of the group consisting of aliphatic hydrocarbons and cyclic and chlorinated forms thereof which comprises bringing said mixture into intimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations and preferentially adsorbing the aromatic components of said mixture.

4. A process for separating at least one member of the group consisting of thiophene and pyridine from a mixture thereof with at least one member of the group consisting of aliphatic hydrocarbons and cyclic and chlorinated forms thereof which comprises bringing said mixture into inimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations and preferentially adsorbing the heterocyclic components of said mixture.

5. A process for the separation of a mixture of organic compounds which comprises bringing a mixture of at least one member from at least two of the following groups: (a) heterocyclic compounds (b) unsubstituted aromatic hydrocarbons (c) alkyl-substituted aromatic hydrocarbons (d) straight-chain hydrocarbons (e) chlorinated straight-chain hydrocarbons (f) branch-chain and alicyclic hydrocarbons into intimate contact with a mineral of the montmorillonite group of which at least a part of the interlamellar ions have been replaced by at least one of the ions of the group consisting of methyl and ethyl substituted ammonium ions and preferentially adsorbing the mixture components in the order in which they appear in the aforementioned groups.

6. A process for the separation of a mixture of organic compounds which comprises bringing a mixture of at least one member from at least two of the following groups: (a) thiophene (b) benzene (c) toluene (d) straight-chain hydrocarbons (e) carbon tetrachloride (f) branch-chain hydrocarbons into intimate contact with a mineral of the montmorillonite group of which at least a part of the interlamellar ions have been replaced by at least one of the ions of the group consisting of methyl and ethyl substituted ammonium ions and preferentially adsorbing the mixture components in the order in which they appear in the aforementioned groups.

7. A process for separating at least one member of the group consisting of benzene and alkyl-substituted benzene from a mixture thereof with at least one member of the group consisting of aliphatic hydrocarbons and cyclic and chlorinated forms thereof which comprises bringing said mixture into intimate contact with a mineral of the montmorillonite group of which at least a part of the interlamellar ions have been replaced by at least one of the ions of the group consisting of methyl and ethyl substituted ammonium ions and preferentially adsorbing the aromatic components of said mixture.

8. A process in accordance with claim 7 wherein the adsorbent is tetramethyl ammonium montmorillonite.

9. A process for separating at least one member of the group consisting of straight-chain hydrocarbons from a mixture thereof with at least one member of the group consisting of branch-chain and alicyclic hydrocarbons which comprises bringing said mixture into intimate contact with a mineral of the montmorillonite group of which at least a part of the interlamellar ions have been replaced by at least one of the ions of the group consisting of methyl and ethyl substituted ammonium ions and preferentially adsorbing the straight-chain hydrocarbons of said mixture.

10. A process in accordance with claim 9 wherein the adsorbent is tetramethyl ammonium montmorillonite.

11. A process for separating at least one member of the group consisting of thiophene and pyridine from a mixture thereof with at least one member of the group consisting of aliphatic hydrocarbons and cyclic and chlorinated forms thereof which comprises bringing said mixture into intimate contact with a mineral of the montmorillonite group of which at least a part of the interlamellar ions have been replaced by at least one of the ions of the group consisting of methyl and ethyl substituted ammonium ions and preferentially adsorbing the heterocyclic components of said mixture.

12. A process for separating benzene from a mixture thereof with at least one member of the group consisting of alkyl-substituted benzene which comprises bringing said mixture into intimate contact with a mineral of the montmorillonite group of which at least a part of the interlamellar ions have been replaced by at least one of the ions of the group consisting of methyl and ethyl substituted ammonium ions and preferentially adsorbing the benzene of said mixture.

13. A process for separating at least one member of the group consisting of thiophene and pyridine from a mixture thereof with at least one member of the group consisting of benzene and alkyl-substituted benzenes which comprises bringing said mixture into intimate contact with a mineral of the montmorillonite group of which at least a part of the interlamellar ions have been replaced by at least one of the ions of the group consisting of methyl and ethyl substituted ammonium ions and preferentially adsorbing the heterocyclic components of said mixture.

14. A process for the separation of oxygen from a mixture of oxygen and at least one of the elements in the group consisting of nitrogen and argon, said process comprising bringing said mixture into intimate contact with montmorillonite of which at least a part of the interlamellar ions have been replaced with an ion of tetramethyl-ammonium, and adsorbing said oxygen with said montmorillonite.

15. A process for the separation of oxygen from a mixture of oxygen and at least one of the elements in the group consisting of nitrogen and argon, said process comprising bringing said mixture into intimate contact with montmorillonite of which at least a part of the montmorillonite ions have been replaced with an ion of tetraethyl ammonium, maintaining said mixture at a temperature of about 78° K. to 90° K. and adsorbing said oxygen with said montmorillonite.

16. A process for the separation of a mixture, the components of said mixture being selected from one of the groups consisting of class A and class B, class A consisting of oxygen and at least one of the elements in the group consisting of nitrogen and argon and class B consisting of at least one member from at least two of the following groups: (a) heterocyclic compounds (b) unsubstituted aromatic hydrocarbons (c) alkyl-substituted aromatic hydrocarbons (d) straight-chain hydrocarbons (e) chlorinated straight-chain hydrocarbons (f) branch-chain and alicyclic hydrocarbons, which process comprises: bringing said mixture into intimate contact with a mineral of the montmorillonite group of which at least a part of the interlamellar ions have been replaced by at least one of the ions of the group consisting of methyl and ethyl substituted ammonium ions, and preferentially adsorbing the mixture components in the order in which they are listed in the hereindefined class A and class B.

17. A process for separating nitrogen and sulfur compounds from a naphtha which comprises bringing a mixture of said compounds and naphtha in intimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations and preferentially adsorbing said nitrogen and sulfur compounds.

18. A process as described in claim 17 wherein the mineral is tetramethyl ammonium ion exchanged montmorillonite.

19. A process as described in claim 17 wherein the sulfur and nitrogen compounds are selected from the group consisting of aromatic mercaptans, sulfides, aliphatic mercaptans, pyrrole and pyridine and the mineral is a montmorillonite having at least a part of the interlamellar ions replaced by lower alkyl substituted ammonium ions.

20. A process for the separation of oxygen from a mixture of oxygen and at least one of the elements in the group consisting of nitrogen and argon, said process comprising bringing said mixture into intimate contact with a mineral of the montmorillonite group having at least part of the interlamellar cations replaced by at least one of the cations selected from the group consisting of lower alkyl substituted ammonium cations, complex metal cations, triethylenediamine cations, hexamethylenetetramine cations, mono phenyl ammonium cations, and guanidinium cations, and preferentially adsorbing said oxygen of said mixture.

References Cited in the file of this patent

UNITED STATES PATENTS 2,965,687    Roberts et al. _____ Dec. 20, 1960